United States Patent [19]

Petroff

[11] 4,065,262
[45] Dec. 27, 1977

[54] FILTER AND AIR FRESHENER APPARATUS

[76] Inventor: Mitchell Petroff, 2038 Isabell, Troy, Mich. 48084

[21] Appl. No.: 738,051

[22] Filed: Nov. 2, 1976

[51] Int. Cl.² .......................... A61L 9/01; B01D 50/00
[52] U.S. Cl. ..................... 21/74 R; 55/279; 239/58; 239/289
[58] Field of Search .......... 21/53, 74 R, 122; 55/279; 239/34, 53–60, 289

[56] References Cited

U.S. PATENT DOCUMENTS

| 2,144,190 | 1/1939 | Merz | 21/74 R |
| 3,120,345 | 2/1964 | Bolger | 21/74 R X |
| 3,595,607 | 7/1971 | Gores | 21/74 R |
| 3,797,742 | 3/1974 | Clark et al. | 239/57 |
| 3,902,877 | 9/1975 | Swaim | 21/74 R X |
| 3,930,797 | 1/1976 | Gertz | 21/74 R X |

*Primary Examiner*—Joseph Scovronek
*Assistant Examiner*—Roger F. Phillips

[57] ABSTRACT

An air filter and air freshener apparatus is disclosed for a domestic air supply comprising an air filter element having a plurality of containers positioned in the air filter for holding an air freshener composition. The containers have removable caps so that any one or a plurality of such containers may be opened to control the quantity of air freshener composition released from the combination air filter and air freshener apparatus when employed in a domestic air supply system.

3 Claims, 3 Drawing Figures

FILTER AND AIR FRESHENER APPARATUS

SUMMARY OF THE INVENTION

The present invention relates to an air filter and air freshener apparatus for filtering air and delivering an air freshener composition to a domestic air supply comprising an air filter element for filtering air, a plurality of sealed air freshener containers positioned for holding an air freshener composition in said air filter, the air freshener containers having individual closures thereon for sealing the containers. The closures are individually removable from the containers to allow air flow therethrough. By employing the aforementioned arrangement, the removal of the closures individually from the containers or from any combination of the containers controls the quantity of the air freshener composition to a domestic air supply system passing through the filter element and the containers having the closures removed therefrom.

In a further embodiment, each of the containers has an effluent opening and in influent opening intersected by a central axis. The central axis lies in a line parallel to the direction of air flow through the air filter. The closures are positioned over the effluent openings and the influent openings of the container.

In yet another embodiment, the closures comprise caps releasably sealed to the containers over the effluent and influent ends thereof to prevent the air freshener composition contained in the containers from volatilizing or evaporating before the caps are removed. Tabs project from the caps for pulling the caps from the containers.

In a further embodiment, the containers are mounted on a panel lying on a plane parallel to the plane of the air filter element. In this embodiment, the containers project through the air filter element, the axis of the container being transverse to the panel and substantially parallel to the line of air flow through the air filter element.

In a further embodiment, the filter is mounted on a frame and additionally the panel may be secured to the frame.

DETAILED DESCRIPTION

Figures 1, 2, 3:
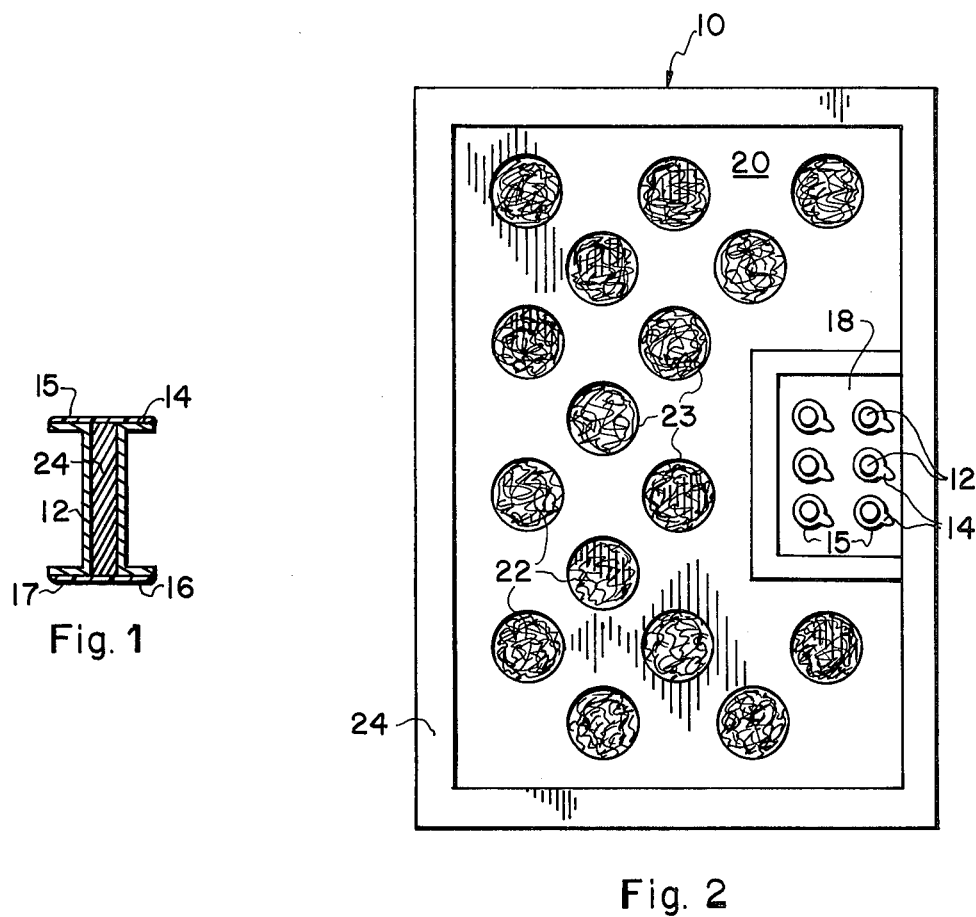
FIG. 1 comprises a side elevation in section of a container having an air freshener composition therein, the influent and effluent ends of the container being sealed by closures or caps removably secured to the influent and effluent means.
FIG. 2 comprises a plan view of an air filter and air freshener apparatus for filtering air and delivering an air freshener composition to a domestic air supply comprising an air filter element and a plurality of seal air freshener containers positioned for holding an air freshener composition in the air filter element according to yet another embodiment of the present invention.
FIG. 3 comprises a partial perspective view of an air filter and air freshener apparatus for filtering air and delivering an air freshener composition to a domestic air supply according to yet another embodiment of the present invention.

Air treatment apparatus for domestic air supply systems are disclosed in the prior art U.S. Pat. Nos. 3,743,181 Bentley; 3,661,323 Farris; 3,211,437 Jaye; 3,190,624 McElreath; 2,786,714 Saleny; 2,502,137 Fleisher; 2,235,116 Ray and 1,718,182 Rose, et al. Many domestic air supply systems require filtering elements in order to minimize the amount of dust and other particulate matter delivered by the system. The supply systems deliver air to various parts of either homes, offices or factories which may from time to time contain domestic odors such as cooking odors, tobacco smoke or industrial fumes. It would be advantageous to deliver an air freshener composition through a domestic air supply system for effective delivery to areas that are either inhabited or in which various tasks are preformed. Because an air freshener would not be required in most instances on a continuous basis, it would also be desirable to provide a device which would deliver an air freshener in selective quantities for a selected period of time. Although mechanical metering apparatus with automatic controls or manual controls may be developed to the latter end, it would be desirable to provide a simple and inexpensive device in combination with an air filter for the selective delivery of a quantity of air freshener composition for a selected period of time to a domestic air supply system.

It is therefore an object of the present invention to overcome these and other difficulties encountered in the prior art and also to provide apparatus to achieve these various ends.

These and other objects have been achieved and apparatus has been developed to accomplish such ends and will become apparent from the disclosure and claims that follow as well as the appended drawing.

Referring to the drawing, an air filter and air freshener apparatus 10 is illustrated comprising a filter element 20 having openings 23 therein, said element 20 being packed with a fibrous material 22 for the filtration or air delivered to a domestic air supply system. A plurality of sealed air freshener containers 12 are positioned for holding an air freshener composition 24 in said air filter element 20. The air freshener containers have individual closures or caps 15 and 17 on the tops and bottoms thereof for sealing the containers, the closures 15 and/or 17 being individually removable from the containers 12 to allow air to flow therethrough or pass over composition 24. This arrangement allows for the removal of the closures 15 and/or 17 individually from the containers 12 and from any combination of containers 12 to control the quantity of the composition 24 delivered to a domestic air supply system passing through the filter element 20 and those containers 12 having the closures or caps 15 and/or 17 removed therefrom. Each of the containers 12 is sealed with a closure or cap 15 and 17 positioned respectively over an effluent and influent opening in the container 12, the effluent and influent openings being intersected by a central axis lying in the direction of air flow through the filter 20. The closures or caps 15 dand 17 may comprise heavy aluminum foil caps sealed by means of an adhesive to the containers 12 or may comprise a sealed cap crimp-sealed to the container 12. Alternately, a thermoplastic cap, such as a polyethylene cap 15 or 17 may be employed and heat-sealed to the container 12 which may be made of a similar thermoplastic material such as polyethylene in this instance. Other thermoplastic materials such as nylon, polypropylene, cellulose acetate, cellulose acetate butyrate and the various art-known equivalents thereof may also be employed. Tabs 14 and similar tabs 16 may be provided on the top and bottom of the closures or caps 15 and 17, respectively, which may be gripped either between the fingers or by means of a tool such as a pair of pliers or other gripping device for pulling the closures or caps 15 and 17 away from the effluent and influent openings of the container 12. The containers 12 are mounted on a panel 18 lying in a plane parallel to the plane of the filter element 20, the containers 12 projecting through the filter 20, the aforementioned central axis of the container being transverse to the panel 18 and lying in a line substantially parallel to the flow of air through the filter 20. In one embodiment illustrated in FIG. 2 and FIG. 3, the panel. 18 is secured to a frame 24 in which the filter element 20 containing filtering material 22 is mounted.

The air freshener composition 24 may comprise a composition on a fibrous wick such as a mixture of a volatile sweetly scented material known in the art in combination with formaldehyde, formalin or any of the art known polymers of formaldehyde. Additionally, the composition 24 may comprise a solid air freshener composition known in the art and the closure 17 need not be removed, the passage of air in and around the vicinity of the container 12 containing such a composition 24 being sufficient to bring the air freshener composition 24 into the domestic air supply system in which the filter element 10 is mounted when the cap 15 is removed from container 12. Alternately, when a solid air freshener composition 24 is employed, a channel or a plurality of channels running the length of composition 24 and parallel to the aforementioned central axis may be provided in the composition 24 so that the closure 17 may be removed as well as the closure 15 and the air freshener composition distributed through the passage of air upwardly through the container 12.

In use, the air filter and air freshener apparatus 10 is mounted in the plenum of a forced air domestic air supply system such as a forced air furnace or forced air air-conditioning system and as the occasion arises, the closures 15 and/or 17 are removed from the containers 12 depending on the need for air freshener in the domestic air supply. As this need increases, an increasing number of container 12 can be pressed into service by removing the caps 15 and/or 17 therefrom.

Although the invention has been described by reference to some embodiments, it is not intended that the novel air filter and air freshener apparatus be limited thereby but that modifications thereof are intended to be included as falling within the broad scope and spirit of the foregoing disclosure, the following claims and the appended drawing.

What is claimed is:

1. Air filter apparatus and air freshener for filtering air and delivering an air freshener composition to a domestic air supply comprising air filter element means for filtering air, a plurality of sealed air freshener container means positioned for holding an air freshener composition in said air filter element, each of said container means having an effluent opening and an influent opening intersected by a central axis, said central axis lying in the direction of air flow through said air filter, said air freshener container means having individual closure means thereon positioned over both and removable from at least one of said influent openings and said effluent openings for sealing said container means, said closure means being individually removable from said container means to allow air to contact said air freshener, said container means being mounted on a panel lying in a plane parallel to the plane of said air filter element means, said container means projecting through said air filter element means, said axis of said container means being transverse to said panel and substantially parallel to the line of air flow through said air filter element means, whereby the removal of said closure means individually from said container means and from any combination of said container means controls the quantity of delivery of said composition to a domestic air supply system passing through said filter element and contacting said container means having said closure means removed therefrom.

2. The air filter and air freshener apparatus of claim 1 where said air filter means is mounted on frame means.

3. The air filter and air freshener apparatus of claim 2 where said panel is secured to said frame.

* * * * *